(12) United States Patent
Steinlage et al.

(10) Patent No.: US 7,036,604 B2
(45) Date of Patent: May 2, 2006

(54) STRUCTURE FOR CONVERTING AN INTEGRAL IMPLEMENT TO A DRAWN TYPE

(75) Inventors: David Lee Steinlage, Adel, IA (US); James Franklin Bierl, West Des Moines, IA (US)

(73) Assignee: Deere & Company, Moline, IL (US)

( * ) Notice: Subject to any disclaimer, the term of this patent is extended or adjusted under 35 U.S.C. 154(b) by 56 days.

(21) Appl. No.: 10/835,204

(22) Filed: Apr. 29, 2004

(65) Prior Publication Data
US 2005/0241840 A1 Nov. 3, 2005

(51) Int. Cl.
*A01B 63/00* (2006.01)

(52) U.S. Cl. .................. 172/452; 172/669; 172/443

(58) Field of Classification Search ............... 172/439, 172/443, 452, 669; 280/416.1, 416.2
See application file for complete search history.

(56) References Cited

U.S. PATENT DOCUMENTS

| | | | |
|---|---|---|---|
| 2,704,021 A | 3/1955 | Brundage ................ 280/43.23 |
| 2,785,615 A * | 3/1957 | McCall et al. ............... 172/443 |
| 2,786,589 A * | 3/1957 | Garrett ........................ 172/445 |
| 3,428,335 A * | 2/1969 | Clark ........................ 280/479.1 |
| 3,727,698 A * | 4/1973 | Van Selus ................... 414/703 |
| 3,974,880 A * | 8/1976 | Filan et al. .................. 172/443 |
| 4,032,169 A * | 6/1977 | Filan et al. .................. 172/443 |
| 4,364,581 A | 12/1982 | Shoup ........................ 172/311 |
| 4,371,039 A * | 2/1983 | Schaaf et al. ............... 172/244 |
| 4,418,762 A | 12/1983 | Page ............................ 172/311 |
| 4,489,789 A * | 12/1984 | Pearce ........................ 172/443 |
| 4,492,272 A | 1/1985 | Jensen ........................ 172/178 |
| 4,624,471 A * | 11/1986 | Haines et al. ............... 172/443 |
| 5,255,756 A * | 10/1993 | Follmer et al. ............. 180/401 |
| 5,291,954 A | 3/1994 | Kirwan ........................ 172/311 |
| 5,409,069 A | 4/1995 | Hake .......................... 172/400 |
| 5,429,195 A | 7/1995 | Turnis ........................ 172/311 |
| 5,890,546 A | 4/1999 | Kerpash, Sr. ............ 172/684.5 |
| 6,119,792 A * | 9/2000 | Almer ...................... 172/799.5 |
| 6,213,034 B1 | 4/2001 | Raducha et al. ............. 111/57 |
| 6,408,950 B1 | 6/2002 | Shoup ........................ 172/311 |
| 6,557,646 B1 | 5/2003 | Hurtis et al. ................ 172/156 |
| 6,758,284 B1 * | 7/2004 | Myers ........................ 172/311 |

OTHER PUBLICATIONS

Case, yield-till system / ecolo-til 2500.
Kaddy Kart 3—Point Tool Carrier.
Blu-Jet Land Tracker 9400 (massive caddy year-round workhorse).
Baker Ripper 400 series.
Blu-Jet Sub Tiller III, Rugged, Versatile Conservation Tillage Equipment.

(Continued)

*Primary Examiner*—Thomas B. Will
*Assistant Examiner*—Alexandra Pechhold

(57) ABSTRACT

A forward acting wheel arm for a drawn hitch includes a pivot point directly below the rear rank of the machine frame, and the wheels are rotated directly in front of the front rank during field operation. For transport, the wheels rotate below the front rank to minimize tongue-lightness. The need for stabilizer wheels on the rear of the machine is eliminated, and the wheel arms can be actuated with either series or parallel hydraulic cylinders. The wheel arm pivot and cylinder base end connection are both located on the same support plate, and the hydraulic cylinder force is internalized within the plate rather than being translated through the wheel module mounting hardware.

18 Claims, 3 Drawing Sheets

OTHER PUBLICATIONS

Blu-Jet SD Series Implement Caddy.
Blu-Jet Folding Sub Tiller III.
Zone-Builder Subsoiler.
Blu-Jet Sub Tiller II.
Photo of QUINSTAR equipment, date unknown.
Photo of DMI equipment, date unknown.
Photo of Blu-Jet equipment, date unknown.
Photo of KRAUSE equipment, date unknown.
Patent Application titled Structure For Converting An Integral Implement To A Drawn Type, U.S. Appl. No. 10/298,619.

* cited by examiner

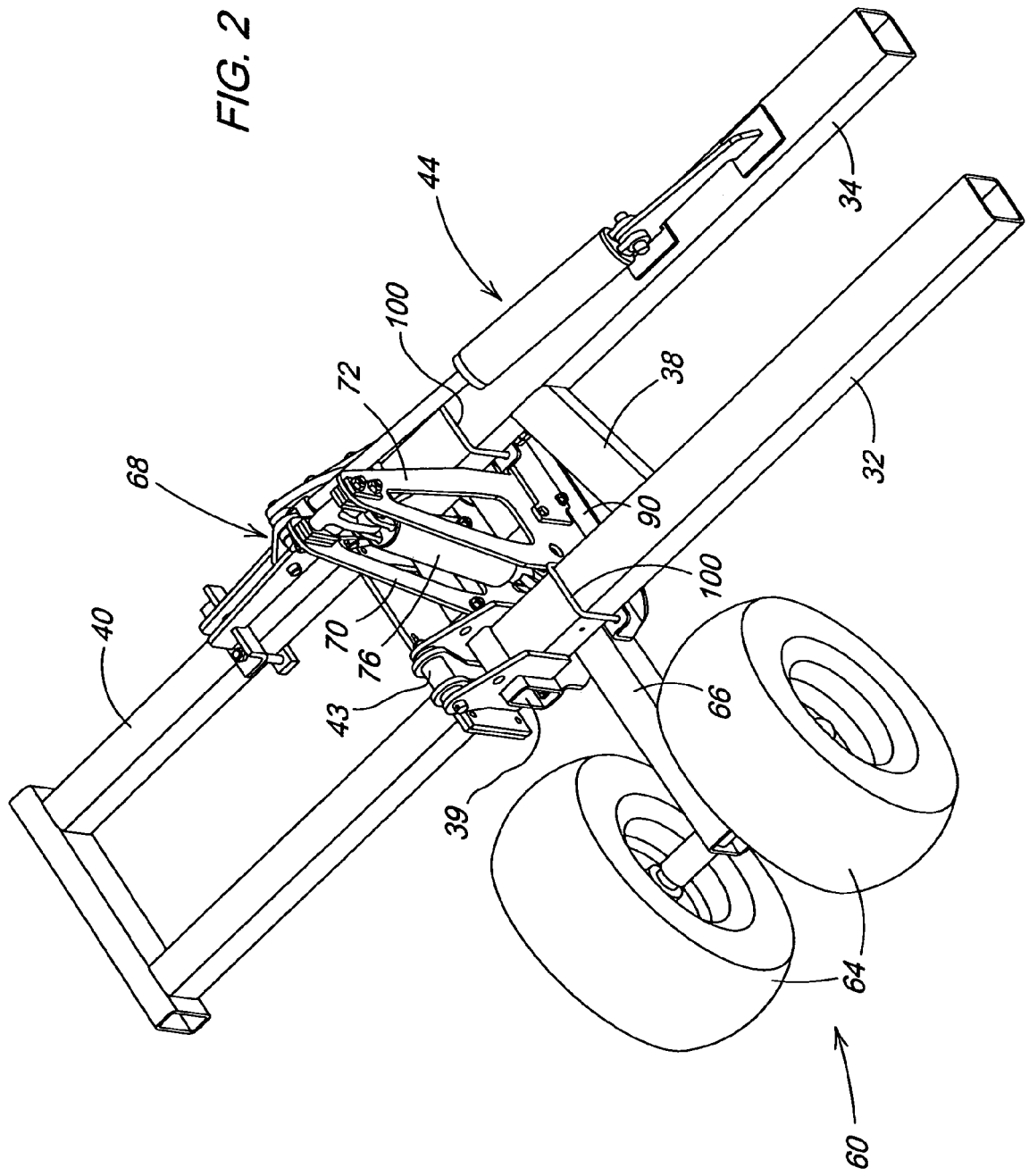

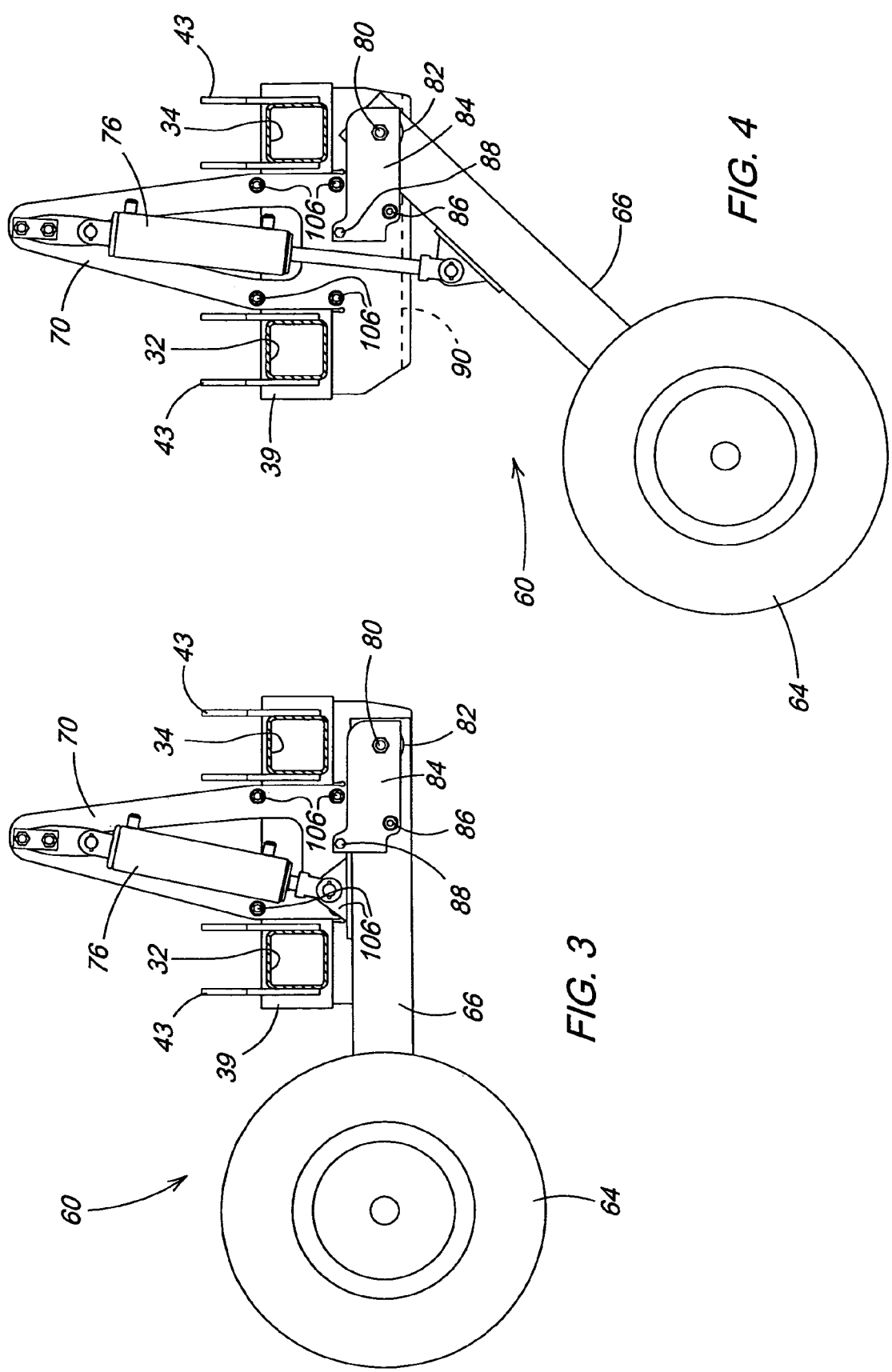

STRUCTURE FOR CONVERTING AN INTEGRAL IMPLEMENT TO A DRAWN TYPE

FIELD OF THE INVENTION

The present invention relates generally to agricultural implements such as rippers, and more specifically to wheel structure for such implements.

BACKGROUND OF THE INVENTION

For years, farmers have used various styles of rippers to fracture soil and improve crop yields. Recently, in-line rippers that can fracture soil without significantly disturbing the soil surface have gained popularity with farmers. In-line rippers have allowed operators to decrease subsequent tillage passes and improve residue retention of their fields to comply to strict erosion guidelines. Agricultural implements such as deep tillage rippers often are towed by a large four-wheel drive (4WD) tractor, especially if the implement is a larger unit with nine or more standards. A problem can arise when the operator desires to pull an integral ripper, which is normally mounted on a three point tractor hitch, since many 4WD tractors in the size range necessary are not equipped with such a hitch. In addition, some operators prefer frames equipped with drawn rather than 3-point hitches on smaller machines with fewer standards for facilitating tractor changes and for speeding hitching and unhitching operations. It is often desirable to have conversion structure for facilitating pull-type ripper operation with an integral ripper design. Numerous hitch attachments are available for converting an integral ripper to a pull-type ripper. Such attachments typically include a hitch assembly that pins into the existing lower hitch plates of the ripper. A turnbuckle is placed from the upper link attachment location on the ripper to an upper surface of the hitch to facilitate horizontal adjustment of the machine front-to-rear for compensating for different tractor drawbar heights. Independent wheel packages are generally placed off the front of the ripper, one on each side, with a forward acting wheel arm and dual tandem wheels.

Hitch attachments for conversion from integral to pull-type can produce some undesirable conditions. A light hitch condition often results from placement of the majority of the implement weight behind the wheels, a condition that produces high vertical hitch loads on the tractor drawbar in the upward direction. The high vertical loads, in turn, produce high axial loads which pass through the turnbuckle. Other negative attributes of the forwardly located wheels include unstable transport conditions and high stresses on certain areas of the implement frame. A further problem with some wheel arrangements is instability or oscillation of the implement while operating in the field as the front of the frame tends to nose downwardly and then rock back upwardly under certain field conditions.

To eliminate some of the problems, placement of the transport wheels near the rear of the machine is helpful. However, numerous obstacles on the rear of the implement frame limit such wheel placement. Placement of the wheels at the rear of the implement creates undesirable moments tending to rotate the front of the frame downwardly. Maintaining proper machine attitude and uniform working depth is a problem.

Using wheels at both the front and the rear of the implement present numerous problems, including the provision of an economically feasible wheel lift and timing system. Hydraulic controls for all the wheels can be expensive and very complex. Manually adjustable gauge wheels often are difficult to fine tune, particularly when the implement is relatively large and heavy. Providing conversion hitch attachments therefore has presented numerous challenges to the implement designer.

A problem with independent wheel modules, regardless of wheel location, is need for structure to keep the wheels timed. A mechanical timing tube is often impractical because of interference with machine components.

Another conversion structure which is the subject of commonly assigned U.S. patent application Ser. No. 10/298,619, filed 15 Nov. 2002 and entitled STRUCTURE FOR CONVERTING AN INTEGRAL IMPLEMENT TO A DRAWN TYPE. The structure described includes a wheel module with both a forward gauge wheel and a rearward transport wheel. The transport wheels are located behind the center of gravity of the implement for stability, and the forwardly located gauge wheels offset the moment resulting from standard draft. Although alleviating some problems, the module design is complex and relatively expensive to manufacture. Residue flow between the ripper standards and transport wheels is hampered, and blockages can occur in some field conditions. Tire tracking in soft ground is another problem since the transport and stabilizer wheels are located between ripper standards, and the tracks are not fully removed by the standards. The module arrangement also requires depth control wheels and stabilizer wheels to be adjusted to change operating depth. Therefore, depth and pitch control changes can be difficult and time-consuming.

SUMMARY OF THE INVENTION

It is therefore an object of the present invention to provide an improved attachment structure for conversion of an integral implement to a pull-type implement. It is a further object to provide such a structure which overcomes most or all of the aforementioned problems.

It is another object of the present invention to provide an improved attachment structure for conversion of an integral in-line implement to a pull-type implement. It is a further object to provide such a structure which is easily adjustable and more simple, reliable, and affordable in design and construction than at least most of the previously available conversion systems.

A forward acting wheel arm for a drawn hitch includes a pivot point directly below the rear rank of the machine frame, and the wheels are rotated directly in front of the front rank during field operation. For transport, the wheels rotate below the front rank for transport to minimize tongue-lightness compared to at least most previously available front acting wheel module systems which are connected to the front rank. The need for stabilizer wheels on the rear of the machine is eliminated to reduce machine cost and complexity. The Deere wheel arms can be actuated with either series or parallel hydraulic cylinders, and depth changes can be made easily by adding or removing cylinder donuts on the master cylinder for the series arrangement or both cylinders for the parallel arrangement. Pitch adjustments of the machine can also be made easily by adjustment of the hitch turnbuckle. The wheel arm pivot and cylinder base end connection are both located on the same support plate, and the hydraulic cylinder force is internalized within the plate rather than being translated through the wheel module mounting hardware. The internalization of the cylinder force allows for a simple set of cylinder anchor plates to be used instead of a complex cylinder anchor weldment.

The wheel arm pivots on the external surface of a bushing which additionally improves the torsional rigidity of the cylinder anchor structure. A mounting bolt and additional bolt and bushing structure connected to the two cylinder plates improve side-to-side stability of the assembly. The backing plates are furthered tied to the side plates and each other by use of two 1.5" long ⅝" bolts and one bolt bushing set. The side plates also have a very long bottom bent flanges providing side-to-side stability and eliminating need for welded tie straps or the like.

The mounting arrangement is easy to attach to the frame. The cylinder anchor connections improve the overall soundness of the wheel module structure. The wheels are located in front of the front rank of the mainframe to allow for maximum residue flow through the coulter/standard area, and a wide wheel module spacing provides excellent side-to-side ground following characteristics in the field. Stabilizer wheels, even on larger winged machines, can be eliminated. Standards located behind the depth control wheels eliminate tire tracks. The simplified cylinder/wheel arm anchor arrangement provides a very low-cost, highly functional, and highly reliable design.

These and other objects, features and advantages of the present invention will become apparent upon reading the following detailed description in view of the drawings.

BRIEF DESCRIPTION OF THE DRAWINGS

FIG. 2 is an enlarged view of a portion of the right side of the tillage implement of FIG. 1 with parts removed to better show frame and wheel module structure;

FIG. 3 is a sectional side view of a wheel module structure with the frame lowered to the field-working position.

FIG. 4 is a view similar to FIG. 3 but showing the wheel positioned for transport of the implement.

DESCRIPTION OF THE PREFERRED EMBODIMENT

Figure 1:
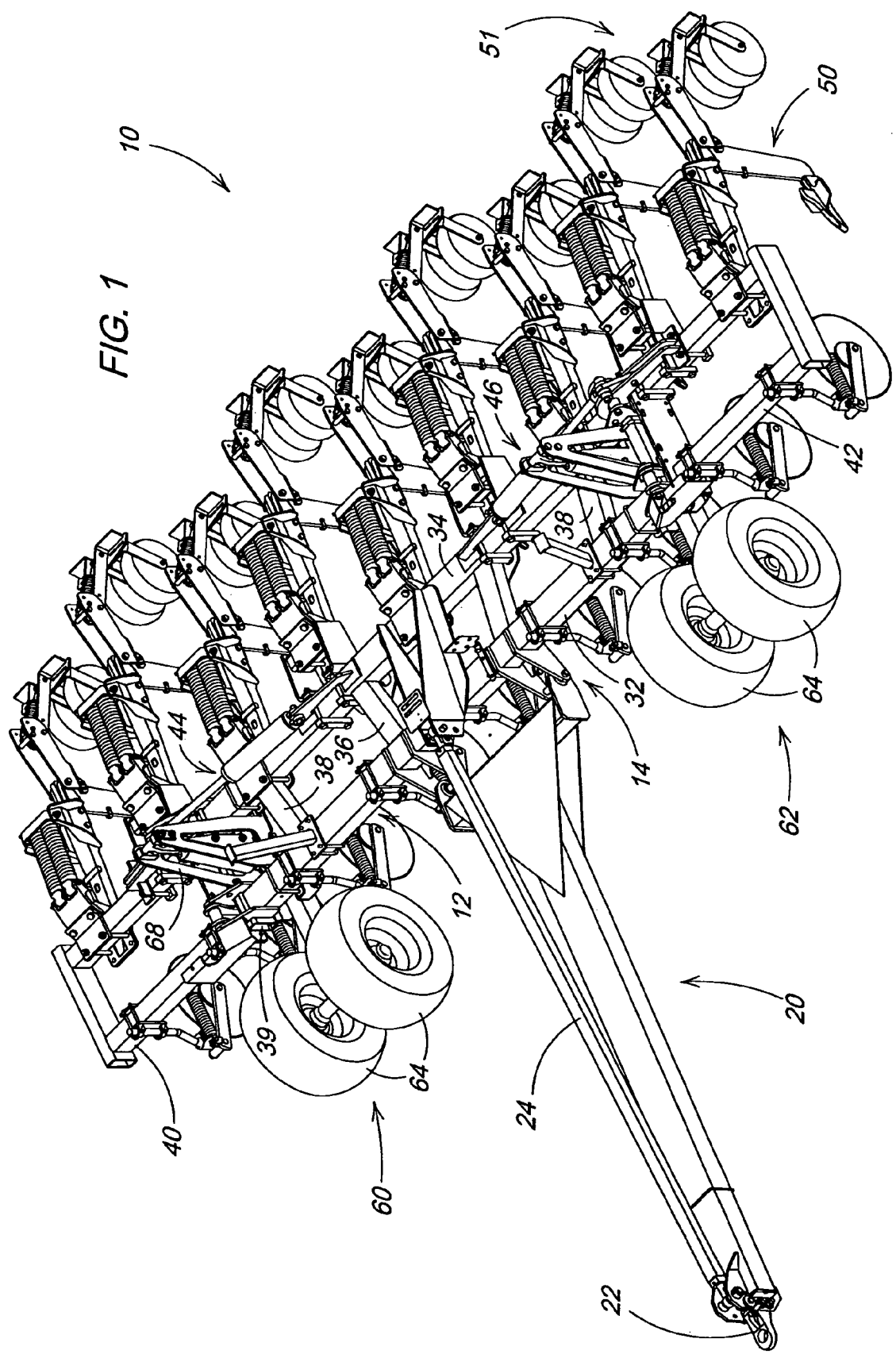
FIG. 1 is a front perspective view of a tillage implement with hitch and wheel module structure attached.

Referring now to FIG. 1, therein is shown an implement 10 such as a ripper or similar deep tillage implement having a main frame 12 and conventional three-point hitch structure 14 adapted for attachment to a three-point hitch (not shown) on a tractor or other towing vehicle. The implement 10 is shown with attachments for conversion to a towed implement. A hitch 20 is pivotally connected at a rearward end to the lower two attaching points of the three-point hitch structure 14. A standard towing connection 22 for attachment to the tractor drawbar is connected to the forward end of the hitch 20. A leveling link 24 extends between the towing connection 22 and the upper connection of the three point hitch structure 14 to provide a generally rigid but adjustable hitch connection to the frame 12.

The frame 12 as shown includes transversely extending front and rear frame members 32 and 34 connected by generally fore-and-aft extending frame members such as shown at 36 and 38 and by end tube members 39. Wing frame sections 40 and 42 are pivotally attached at the ends of the main frame 12 by hinge structure 43 (FIGS. 2–4) and are pivotable from the working position shown upwardly and inwardly to a folded transport position by wing lift assemblies 44 and 46. Ripper standards 50 (FIG. 1) or other earth-engaging tools are connected at transversely spaced locations to the frame members 32 and 34 and the wing frame sections 40 and 42. The tools can include rear mounted rolling baskets or leveling wheels such as shown at 51 which tend to move the center of gravity of the implement 10 rearwardly.

Wheel modules 60 and 62 are connected to the opposite ends of the main frame 12 inwardly adjacent the wing frame sections 40 and 42, respectively, and outwardly of the frame members 38. Each module includes ground engaging wheels 64 supported on the lower forward end of a wheel arm 66 (FIGS. 2–4) pivotally connected at an upper aft end to upright bracket structure 68 extending between the front and rear frame members 32 and 34. The bracket structure 68 includes first and second transversely spaced cylinder anchor side plates 70 and 72 (FIG. 2) supporting the base end of an upright lift motor or hydraulic cylinder 76 therebetween. The rod end of the cylinder 76 is connected to the lift arm 66 at a location below and between the members 32 and 34 for raising the main frame 12 with extension of the cylinder and lowering the frame with retraction of the cylinder. The cylinder 76 pivots the wheel arm 66 between a field-working position (FIGS. 2 and 3) wherein the wheels 64 extend forwardly of the front frame member 32, and a transport position (FIG. 4) wherein the wheels are located generally below the frame member 32.

The anchor side plates 70 and 72 are connected by a large mounting bolt 80 (FIGS. 3 and 4) extending through apertures in the lower aft ends of the plates below the frame member 34. The bolt 80 also extends through a large diameter pivot bushing 82 pivotally supporting the aft end of the wheel arm 66 and through backing plates 84 adjacent each of the plates 70 and 72 to improve side-to-side stability of the wheel module. The backing plates 84 are also tied to the respective side plates 70 and 72 and to each other by bolts and bolt and bushing assemblies 86 and 88. A fore-and-aft extending bent bottom flange 90 on each side plate further increases the side-to-side stability of the structure. The large mounting bolt 80 is heavily torqued and clamps the pivot bushing 82, which has a diameter on the order of 2.75 inches, between the plates 70 and 72 so that side forces on the wheel arm 66 are smoothly and gradually transitioned into the side plates. The plate and bearing construction provide a strong, reliable connection without requiring welded tie straps.

The cylinder anchor plates 70 and 72 are connected by U-bolts 100 (FIG. 2) to the front and rear frame members 32 and 34 with the base end mount supported above and between the frame members 32 and 34. In the configuration shown in the figures wherein the wheel modules 60 and 62 are located adjacent the outermost end of the main frame 12, the plates 70 and 72 are also connected by bolts 106 to the end tubes 39. The multi-direction connection of the bracket structure 68 to the frame 12 helps strengthen the overall mounting arrangement. The dual arrangements of the wheels 64 control the depth of operation of the tools 50 in the field-working position, and each wheel is located nearly in line with one of the trailing tools so wheel tracks are completely eliminated from the final soil profile. The cylinder 76 is supported between and protected by the plates 70 and 72. By locating the wheel arm pivot and cylinder base end connection on the same support plate structure, and the hydraulic cylinder force is internalized within the plate structure rather than being translated through the wheel module mounting hardware.

Having described the preferred embodiment, it will become apparent that various modifications can be made without departing from the scope of the invention as defined in the accompanying claims.

The invention claimed is:

1. Wheel structure for attachment to forward and aft spaced, transversely extending frame members of a tool-supporting implement, the implement having a hitch adapted for connection to a towing vehicle for movement forwardly over the ground in a raised transport position and forwardly over a field in a lowered working position with tools engaging the soil, the wheel structure comprising:
    a single wheel arm;
    bracket structure connected between the frame members, the bracket structure comprising first and second upright plates extending between and projecting above the forward and aft frame members, the bracket structure connecting the forward and aft frame members;
    a lift arm having an upper aft end located between the first and second upright plates, the upper end pivotally connected to the bracket structure adjacent the aft frame member, and a lower end extending forwardly and downwardly from the upper aft end;
    wheel structure connected to the lower end of the wheel arm;
    motor structure connected between the bracket structure and the wheel arm between the forward and aft frame members for pivoting the single wheel arm between a field-working position wherein the wheel structure extends forwardly of the forward frame member and transport position wherein the wheel structure is located below the frame members, wherein the motor structure and the lift arm are supported from the upright plates and forces between the motor structure and lift arm are internalized within the upright plates.

2. The wheel structure as set forth in claim 1 including a fore-and-aft extending frame end connecting ends of the spaced frame members, and wherein the bracket structure is connected to the forward and aft spaced frame members and to the frame end.

3. The wheel structure as set forth in claim 2 wherein the bracket structure is connected to the frame end adjacent a hinge connection of the frame members to a wing frame.

4. The wheel structure as set forth in claim 3 wherein the wheel structure includes first and second transversely spaced wheels supported generally in line with trailing tools so that wheel tracks are eliminated.

5. The wheel structure as set forth in claim 1 including a wheel arm pivot sandwiched between lower ends of the bracket structure below the aft frame member.

6. The wheel structure as set forth in claim 1 wherein the wheel structure and the hitch support and stabilize the implement independently of stabilizing wheels.

7. In an implement having a frame with forward and aft transversely extending frame members, a 3-point hitch connected to the frame members and adapted for connection to a mating connection on the towing vehicle for movement forwardly over the ground in a raised transport position and forwardly over a field in a lowered working position with tools engaging the soil, towing structure for facilitating towing of the implement by drawn hitch structure, the towing structure including:
    a drawn hitch connected to the 3-point hitch of the implement;
    wheel module structure connected to the frame, the wheel module structure including bracket structure connected between the frame members and having an upper cylinder supporting end located above and generally between the frame members, a wheel arm having an upper rearward end pivotally connected to the bracket structure and extending forwardly and downwardly to a connection with a ground wheel assembly, and a lift cylinder connected between the cylinder supporting end and the wheel arm for pivoting the wheel arm between a field-working position wherein the wheel structure extends forwardly of the forward frame member and transport position wherein the wheel structure is located generally below the frame members; and
    wherein the bracket structure includes a pair of upright side plates connecting the forward and aft frame members.

8. The implement as set forth in claim 7 including a bearing sandwiched between the side plates below the aft frame member and supporting the upper rearward end of the wheel arm.

9. The implement as set forth in claim 7 wherein the lift cylinder includes a base end connection with an upper end of the side plates and a rod end extending downwardly between the plate members to a rod end connection with the wheel arm, wherein the wheel arm pivotal connection with the bracket structure and the cylinder base end connection are both located on the support plates so hydraulic cylinder force is internalized within the plates.

10. The implement as set forth in claim 7 wherein the side plates include lower flanged ends.

11. The implement as set forth in claim 7 wherein the wheel module structure includes a pair of wheels supported generally forwardly of the tools engaging the soil so that wheel tracks are eliminated.

12. The implement as set forth in claim 7 wherein the frame includes a fore-and-aft extending frame end member, and wherein the bracket structure is connected to the frame end member and to the forward and aft transversely extending frame members.

13. The implement as set forth in claim 12 wherein the ground wheel assembly includes side-by-side wheels and wherein one of the wheels is offset generally forwardly and outwardly of the frame end member.

14. The implement as set forth in claim 7 wherein the tools include deep tillage tools supported from the aft transversely extending frame member.

15. The implement as set forth in claim 14 wherein the ground wheel assembly includes wheels located generally forwardly of the deep tillage tools, the deep tillage tools eradicating ground wheel tracks as the implement is moved forwardly in the lowered working position.

16. The implement as set forth in claim 12 further comprising outer wing frame hinge structure connected to the fore-and-aft extending frame member.

17. In an implement having a frame with forward and aft transversely extending frame members, a 3-point hitch connected to the frame members and adapted for connection to a mating connection on the towing vehicle for movement forwardly over the ground in a raised transport position and forwardly over a field in a lowered working position with tools engaging the soil, towing structure for facilitating towing of the implement by drawn hitch structure, the towing structure including:
    a drawn hitch connected to the 3-point hitch of the implement; and
    wheel module structure connected to the frame, the wheel module structure including bracket structure connected between the frame members and having an upper cylinder supporting end located above and generally between the frame members, a wheel arm having an upper rearward end pivotally connected to the bracket structure and extending forwardly and downwardly to a connection with a around wheel assembly, and a lift cylinder connected between the cylinder supporting end and the wheel arm for pivoting the wheel arm between a field-working position wherein the wheel structure extends forwardly of the forward frame member and transport position wherein the wheel structure is located generally below the frame members;

wherein the bracket structure includes a pair of upright side plates connecting the forward and aft frame members;

including a bearing sandwiched between the side plates below the aft frame member and supporting the upper rearward end of the wheel arm; and further comprising a backing plate connected to the side plates adjacent the bearing to improve side-to-side stability of the wheel module structure.

18. The implement as set forth in claim 17 wherein the side plates include a lower strengthening flange, and wherein the backing plate is supported at a location upwardly adjacent the flange.

* * * * *